United States Patent Office 3,153,570
Patented Oct. 20, 1964

3,153,570
PRODUCTION OF RARE EARTH CHLORIDES
OF HIGH PURITY
William E. Domning and Dale L. Schechter, Midland, Mich., assignors to The Dow Chemical Company, Midland, Mich., a corporation of Delaware
No Drawing. Filed Mar. 9, 1960, Ser. No. 13,722
2 Claims. (Cl. 23—17)

The invention is an improved method of producing rare earth chlorides of high purity which may be reduced to produce high purity rare earth metals.

The term, rare earth metal, is used herein to designate any of the elements of the periodic table of elements having atomic numbers 21, 39, and 57 to 71, inclusive, or otherwise stated: csandium, yttrium, and the elements from lanthanum to lutecium, inclusive. The combination characteristics of the elements so designated are now well known and descriptions thereof may be found in standard references, e.g., Comprehensive Inorganic Chemistry, volume IV, by Sneed and Brasted, page 121 to 187, published by D. Van Nostrand Co., New York (1955), and Inorganic Chemistry by Ephraim, sixth edition, pages 447 to 463, published by Oliver and Boyd, London (1954).

Despite the term, rare earth, compounds of a number of the elements so classified do exist in appreciable quantities in nature. Among the ores containing compounds of such elements are monazite, gadolinite, fergusonite, samarskite, xenotime, yttrocerite, cerite, and allanite. Increasing uses for the rare earth metals have been found and an increasing demand therefor has resulted. Uses for the rare eath metals and compounds thereof include the manufacture of alloys, optical glass, gas mantles, in some instances such substances as tracer bullets, luminescent cells, and pyrotechnics and as laboratory reagents, e.g., oxidizing agents.

Greater uses for rare earth metals and their compounds have necessarily been accompanied by a need for improved methods of their production and improved purity of the metals and their compounds being produced. Rare earths are commonly produced from a natural ore. Monazite, for example, largely a rare earth phosphate containing Ce, Y, Th, and Si, may be subjected to a series of treatments to obtain the oxides of the rare earth metals which may be then converted to halides and subsequently reduced to the metal by the action of such reducing metals as Li, Na, and Ca. The complete separation of the various rare earth metals entails a combination of separation steps based upon variations in such properties as solubility, basicity, crystallization, and behavior in ion exchange resins. Yttrium metal, as illustrative of a rare earth metal as defined herein, has commonly been prepared from the yttrium trifluoride, one reason therefor being its easy preparation. However, the trifluoride is high melting, has low volatility, and gives rise to product salts which are usually insoluble, relatively non-volatile, and difficult to separate from the metallic yttrium product. A further objection to the use of yttrium trifluoride is that it is reducible to metallic yttrium only by the employment of lithium or calcium metal. The use of yttrium trichloride instead of yttrium trifluoride as the intermediate from which to prepare other yttrium compounds or yttrium metal has not been widely used because an appreciable amount of oxides are formed during the production of the chloride and such oxides have been heretofore extremely difficult to remove completely from the chloride thus made or from the metal reduced from such chloride.

One of the preferred methods of preparing a rare earth chloride, e.g., yttrium chloride, has been found to consist of reacting yttrium oxide with ammonium chloride, preferably with from 2 to 3 times the amount of ammonium chloride necessary to provide the stoichiometric quantity to react with the yttrium oxide, in accordance with the following equation:

$$Y_2O_3 + 6NH_4Cl \rightarrow 2YCl_3 + 6NH_3 + 3H_2O$$

The reaction mixture is usually first heated to from 300° to 600° C. to drive off any excess of $NH_4Cl$. It can be observed by reference to the equation and temperature of reaction that water is formed in the reaction which evolves as steam. The steam thus formed reacts with the highly hygroscopic $YCl_3$ produced and forms an oxidic coating about the particles of $YCl_3$.

There is clearly a need, therefore, for a method of producing rare earth chlorides and rare earth metals by reducing such chlorides which results in a substantially improved quality of the chloride and the rare earth metal produced.

The principal object of the invention is to provide such method, the manner by which such object is accomplished being fully described hereinafter.

The invention, accordingly, is a method of producing a rare earth chloride of high purity and consists essentially of reacting a mixture of an oxide of a rare earth metal selected from the class consisting of the elements of atomic numbers 21, 39, and 57 to 71, inclusive, of the periodic table of the elements and at least twice the stoichiometric quantity of $NH_4Cl$ required to react with the rare earth metal oxide present, at a temperature between about 250° and 600° C., while passing a substantially inactive gas therethrough, to produce the rare earth chloride as a crude chloride contaminated with an oxide and vacuum distilling the thus made oxide-contaminated rare earth chloride at a temperature of between 700° and 1100° C. at an absolute pressure of less than 10, and preferably less than 0.1 millimeter of mercury, while passing a substantially inactive gas upwardly therethrough for a time sufficient to distil the rare earth chloride to separate the more volatile chloride from the oxidic impurities, and condensing the thus separated rare earth chloride in a substantially purified state.

In the practice of the invention it is preferable, while passing the substantially inactive gas upwardly therethrough, to heat the $NH_4Cl$ and rare earth oxide mixture first to between about 250° and about 325° C., which is a temperature at which the rate of reaction is accelerated but which is below the volatilization (i.e. sublimation temperature of 335° C.) of $NH_4Cl$, and then to heat the substantially reacted mixture, while passing the inactive gas therethrough, at between about 500° and about 600° C., to drive off unreacted $NH_4Cl$. Thereafter the crude rare earth chloride so formed is subjected to vacuum distillation, as above described.

The invention may be practiced in any suitable equipment comprising a reactor provided with a heating, stirring, and evacuating means and a collection means for recovering the purified $YCl_3$. The reactor is preferably composed of or lined with a resistant material, e.g., tantalum.

The following example is illustrative of the practice of the invention.

$YCl_3$ was prepared by reacting $NH_4Cl$ and a $Y_2O_3$ source material having the $Y_2O_3$ content and containing the small amounts of the Ca and Dy and trace amounts of other rare earth metals set out hereinbelow:

| | Percent |
|---|---|
| $Y_2O_3$ | 98 |
| Dy | 0.8 |
| Ca | 0.1 |

Other metals present in trace amounts were Ce, Eu, Gd, La, Sm, Nd, Yb, and Er.

824 grams of $NH_4Cl$ and 290 grams of the $Y_2O_3$ material having the above analysis were admixed in a reactor of the type described above. Argon gas was admitted at the bottom of the reactor, passed upwardly therethrough, and vented at the top thereof. The mixture was heated to a temperature of 300° C. for 7 hours and then to a temperature of about 600° C. for at least three hours. It was thereafter cooled and the product thus made analyzed and found to consist of 95.5 percent $YCl_3$, with trace amounts of the other rare earth chlorides corresponding to those present as the oxides, and 4.5 percent $Y_2O_3$. There was no unreacted $NH_4Cl$ present.

The material thus made was then placed in a reactor provided with an evacuation means and a condenser for recovering volatilized and purified $YCl_3$. The contents of the reactor were heated at a temperature of 1000° C. for 16 hours at an average pressure of 0.001 millimeter of mercury in accordance with the practice of the invention. The $YCl_3$ was volatilized and condensed. The condensed material recovered was analyzed and found to be substantially pure $YCl_3$.

Chlorides of other rare earth metals, viz., Sc, and those of the lanthanide series may be prepared by a method similar to that described above for the production of $YCl_3$ and the chloride thus prepared purified by sublimation or distillation under an absolute pressure of no greater than 10 millimeters of mercury at a temperature of between 700 and 1100° C.

The rare earth metal itself may then be obtained from the thus purified chloride by reacting it with a reducing agent such as calcium or sodium by known methods. The rare earth metal thus produced is of satisfactory purity for use in alloys, chemical reagents, and other uses requiring high purity.

Having described the invention, what is claimed and desired to be protected by Letters Patent is:

1. The method of producing a rare earth chloride of high purity consisting of reacting a mixture of an oxide of said rare earth metal selected from the class consisting of the elements of atomic numbers 21, 39, and 57 to 71, inclusive, and between 2 and 3 times the stoichiometric quantity of $NH_4Cl$ required to react with said rare earth oxide, at a temperature between about 250° and 325° C., while passing an inert gas upwardly therethrough to remove moisture which tends to form an undesirable oxidic coating about the rare earth chloride thereby to produce the chloride of said rare earth metal contaminated with an oxide of said rare earth metal and with some unreacted $NH_4Cl$ intermixed therewith, heating the contaminated chloride so produced at a temperature between about 500° and 600° C. to drive off unreacted $NH_4Cl$, and thereafter subjecting the contaminated rare earth chloride thus produced to an absolute pressure of about 0.1 millimeter of mercury and a temperature between about 700° and 1100° C., for about 3 hours, to volatilize off substantially all of said rare earth chloride of said contaminated chloride, and recovering the thus volatilized rare earth chloride substantially free from contamination.

2. The method according to claim 1 wherein said rare earth oxide is substantially $Y_2O_3$ and said rare earth chloride produced is substantially pure $YCl_3$.

References Cited in the file of this patent

UNITED STATES PATENTS

| | | |
|---|---|---|
| 1,425,667 | McKirahan | Aug. 15, 1922 |
| 1,843,060 | Ashcroft | Jan. 26, 1932 |
| 2,545,920 | Fried | Mar. 20, 1951 |
| 2,578,416 | Fried | Dec. 11, 1951 |
| 2,580,357 | McDuffie et al. | Dec. 25, 1951 |
| 2,743,168 | Krohn et al. | Apr. 24, 1956 |
| 2,816,813 | Cunningham | Dec. 17, 1957 |
| 2,859,097 | Davidson et al. | Nov. 4, 1958 |
| 2,860,948 | Fried | Nov. 18, 1958 |
| 2,865,704 | Jaffey et al. | Dec. 23, 1958 |
| 2,928,721 | Mason et al. | Mar. 15, 1960 |

OTHER REFERENCES

Reed et al.: J. Amer. Chem. Soc., vol. 57, pages 1159–1160 (July 1935).

Sneed and Brasted: "Comprehensive Inorganic Chemistry," vol. 4, pages 146, 172 (1958).

Schmidt et al.: Chem. Abstracts, vol. 30, page 3349 (April-June 1936).